(12) United States Patent
Bohn (10) Patent No.: US 6,800,978 B2
(45) Date of Patent: Oct. 5, 2004

(54) CONTACT WASHER SYSTEM AND METHOD FOR CONTROLLING A WINDSCREEN WIPER MOTOR

(75) Inventor: Roland Bohn, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 10/169,246

(22) PCT Filed: Sep. 26, 2001

(86) PCT No.: PCT/DE01/03695

§ 371 (c)(1),
(2), (4) Date: Oct. 30, 2002

(87) PCT Pub. No.: WO02/34587

PCT Pub. Date: May 2, 2002

(65) Prior Publication Data

US 2003/0111917 A1 Jun. 19, 2003

(30) Foreign Application Priority Data

Oct. 28, 2000 (DE) .......................... 100 53 688

(51) Int. Cl.⁷ ................................................ H02K 3/00
(52) U.S. Cl. .................. 310/180; 318/443; 318/444
(58) Field of Search ............................ 310/180, 68 A; 318/443, 444

(56) References Cited

U.S. PATENT DOCUMENTS

| | | | | |
|---|---|---|---|---|
| 3,684,938 A | * | 8/1972 | Ori ........................... | 318/443 |
| 4,123,694 A | * | 10/1978 | Andrei-Alexandru et al. ... | 318/443 |
| 4,271,381 A | * | 6/1981 | Munz et al. ................. | 318/282 |
| 4,275,477 A | * | 6/1981 | Kato ......................... | 15/250.02 |
| 4,350,938 A | * | 9/1982 | Ecole ......................... | 318/443 |
| 4,700,026 A | | 10/1987 | Kamiyama et al. | |
| 4,733,147 A | * | 3/1988 | Muller et al. ............... | 318/443 |
| 5,049,794 A | * | 9/1991 | Okada et al. ............... | 318/443 |
| 5,654,616 A | * | 8/1997 | Suriano et al. ............. | 318/443 |
| 5,691,612 A | * | 11/1997 | Corey ........................ | 318/444 |
| 5,694,011 A | * | 12/1997 | Corey et al. ................ | 318/444 |
| 5,923,137 A | * | 7/1999 | Amagasa et al. ........... | 318/443 |
| 6,147,466 A | * | 11/2000 | Stronczek ................... | 318/443 |

FOREIGN PATENT DOCUMENTS

GB  2 313 452  11/1997

OTHER PUBLICATIONS

Patent Abstracts of Japan vol. 1998, No. 02, Jan. 30, 1998 & JP 09 277908 A (Ichikoh Ind Ltd), Oct. 28, 1997 Abstract*.
Patent Abstracts of Japan vol. 2000, No. 07, Sep. 29, 2000 & JP 2000 118360 A (Jidosha Denki Kogyo Co Ltd), Apr. 25, 2000 Abstract*.

* cited by examiner

Primary Examiner—Dang Le
Assistant Examiner—Nguyen Hanh
(74) Attorney, Agent, or Firm—Kenyon & Kenyon (57) ABSTRACT

A contact-disk system is described having a rotatable contact disk and a plurality of contact elements, the contact disk having a plurality of paths and each contact element being assigned to one path. Two selected contact elements of the plurality of contact elements are always at the same electrical potential and glide on the same path. A windshield-wiper motor and a method for controlling a windshield-wiper motor are also described.

11 Claims, 12 Drawing Sheets

Fig.1

Prior Art

CONTACT WASHER SYSTEM AND METHOD FOR CONTROLLING A WINDSCREEN WIPER MOTOR

FIELD OF THE INVENTION

The present invention relates to a contact-disk system having a rotatable contact disk and a plurality of contact elements, the contact disk having a plurality of paths and each contact element being assigned to one path. The present invention also relates to a method for controlling a windshield-wiper motor using a contact-disk system having a rotatable contact disk and a plurality of contact elements, the contact disk having a plurality of paths and each contact element being assigned to one path. Furthermore, the present invention relates to a windshield-wiper motor which comprises a contact-disk system having a rotatable contact disk and a plurality of contact elements, the contact disk having a plurality of paths and each contact element being assigned to one path.

BACKGROUND INFORMATION

Conventional windshield-wiper devices may include contact-disk systems as well as methods for controlling windshield-wiper motors for cleaning of motor vehicle windshields. The windshield-wiper devices may be operated by a switch which may be located in the vehicle interior, the switch being implemented, for example, as a steering-column switch. By operating the steering-column switch, the windshield-wiper device may be shifted from a switched-off state to at least one operating state. The operating states may be implemented by a plurality of windshield-wiper speeds and an intermittent control.

To ensure that the windshield wipers do not come to rest in an intermediate position when the windshield wiper is switched off by the steering column switch, but instead are properly guided back to park position, contact-disk systems may be used. Such contact-disk systems may maintain a closed circuit, in which the windshield-wiper motor operates, until the windshield wipers have reached the park position.

Figure 1:
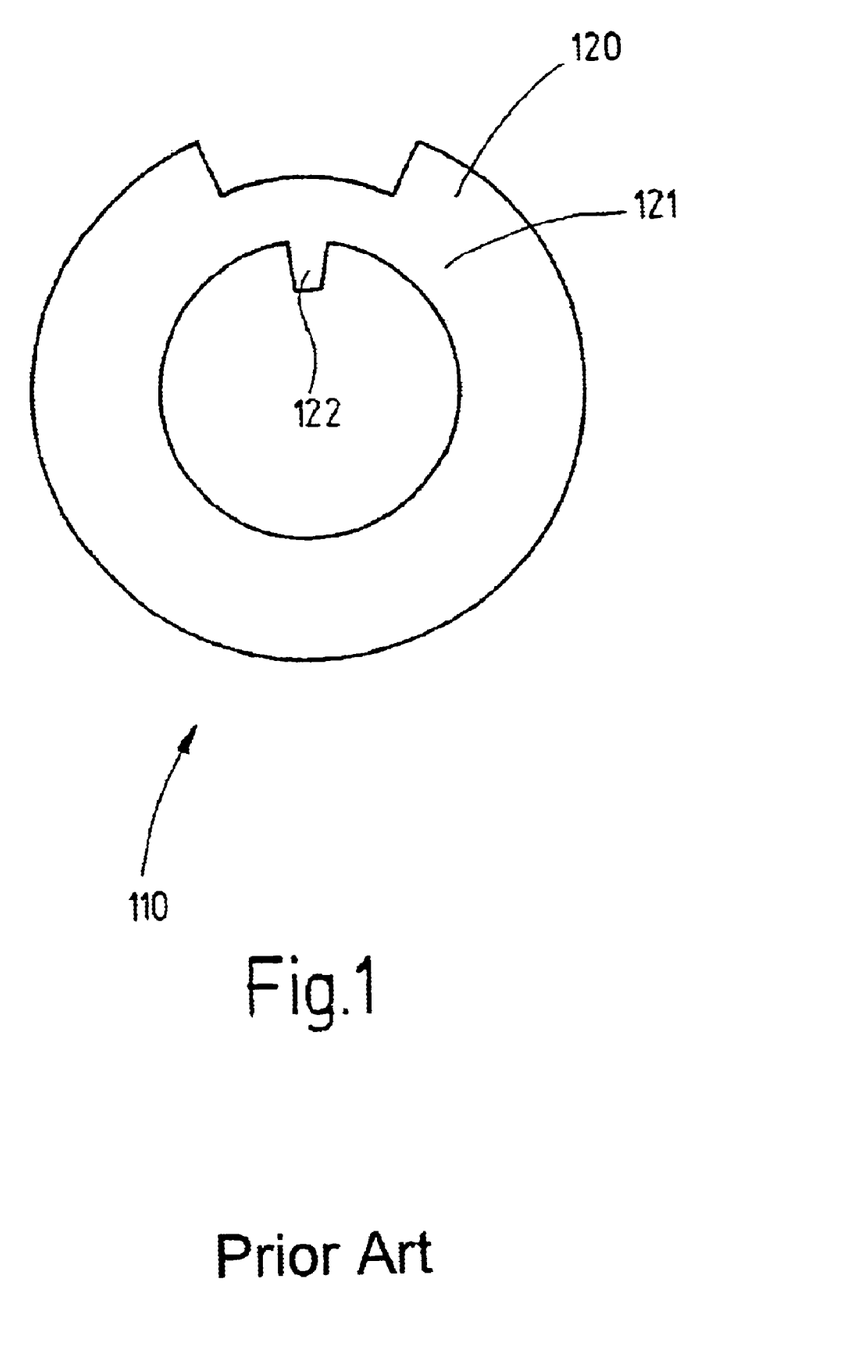
FIG. 1 shows a conventional contact disk.

FIG. 1 shows a contact disk 110 which may be used in a conventional contact-disk system. A contact disk 110 of this kind may be installed in generic windshield-wiper motors in such a manner that it rotates in synchronism with the windshield-wiper motor. Contact disk 110 establishes contact with three contact elements, which in each case glide on one path of contact disk 110. A first contact element glides on outer path 120, which has a gap. A second contact element glides on inner path 122, which is implemented as a short path, and a third contact element glides on a center path 121, which is continuous. Such a construction may maintain a current flow in all motor settings, except for the end position and in an area approaching the end position. This may be achieved by a contact element, which is connected to the positive pole of the battery, gliding on outer path 120. A contact element gliding on center path 121 is connected to the wiper motor. Therefore, a current flow from the positive pole of the battery to the wiper motor is maintainable as long as the first contact element glides on a conductive region of outer path 120. The current flow may only be interrupted when contact disk 110 has rotated to the point where the contact element is located in the gap in outer path 120. Due to the inertia of the motor, the contact disk continues to rotate despite the interrupted current flow. However, this further rotation may come to an end when the conductive region of short, inner path 122 connects with a contact element. This contact element is switched such that the motor is short-circuited and may be actively braked in this manner.

Due to the three paths of a conventional contact disk, it may have a certain minimum size. However, in the case of windshield-wiper motors it is desirable to achieve an overall size that is as small as possible, and, therefore, in particular also a small size of the contact disk. A small size of the contact disk may also be desirable in the production of windshield-wiper motors, in particular in rear-wiper motors with oscillating gears, where the contact disk may be required to be arranged with the contacting on the opposite side with respect to the oscillating gear. For this reason, the windshield-wiper motor may be required at present to be rotated on the assembly line during production, which may make the production process expensive.

SUMMARY OF THE INVENTION

The present invention builds on the conventional contact-disk system in that the contact disk may have two paths and in that two selected contact elements of the plurality of contact elements may always be at the same electrical potential and glide on the same path. In this manner, an electric current flow may be maintained, with a two-path contact disk, until the park position of the windshield wiper is reached or until shortly before the park position has been reached. Because the contact disk may require no more than two paths it may have a smaller size and a smaller radial overall width, which may be desirable with respect to the mentioned overall size of the windshield-wiper motor and in view of the manufacturing process.

The selected contact elements may glide on a first path, which may have an electrically conductive and an electrically insulating area, and at least one contact element of the selected contact elements is connected to the electrically conductive area. If the windshield-wiper motor is switched off by operating the steering-column switch, an electrical connection to the wiper motor may be maintained at least via one of the selected contact elements, since at least one of the selected contact elements may always be in contact with the electrically conductive area of the first path.

The electrically insulating area of the first path may be implemented by a gap in a conductive path, and the selected contact elements may have a spacing that is larger than the gap of the first path. Therefore, given a circular contact disk, the electrically insulating area may be realized by a cut-out with radially extending boundaries. If the opening angle of this gap is less than the clearance angle of the selected contact elements, it may be assured in this manner that one of the selected contact elements is always in contact with the electrically conductive area of the first path.

A first, additional contact element may glide on the first path. This first additional contact element may be used to maintain an electrical connection between the contact disk and the positive pole of the vehicle battery. Therefore, even when the steering-column switch is in the off-position, an electrical connection mat be maintained between the positive pole of the battery and the motor via the first additional contact element and at least one of the selected contact elements. Only when the first additional contact element leaves the electrically conductive area of the first path and is located in the insulating area of the first path, may the current flow be interrupted.

A second path may have an electrically insulating area and an electrically conductive area. A second additional contact element may glide on the second path. This contact element may be used to realize an electrical short-circuit of the motor and to actively brake the motor in this manner once the park position has been reached.

The gap in the first path, the electrically conductive area of the second path, the first additional contact element and the second additional contact element may be arranged with respect to one another in such a manner that a state exists in which neither the first additional contact element nor the second additional contact element are connected to an electrically conductive area of the first path and the second path, respectively. Although the current flow in the electrical circuit of the windshield-wiper motor may already be interrupted, the motor and the contact disk may still continue to rotate, due to their inertia. During this phase the motor speed may be reduced, and an active braking of the motor may only occur, due to the electrical short-circuit, when the second additional contact element makes contact with the electrically conductive area of the second path.

The angular range, which may be covered by the electrically conductive area of the second path, may be less than the angular range that is covered by the electrically insulating area of the first path. As a result, the first additional contact element may have already left the conductive area of the first path due to the rotation of the contact disk, while the second additional contact element may have not yet reached the conductive area of the second path. Therefore, the motor may be neither actuated nor actively braked in this intermediate state. The motor may continue to rotate due to its inertia, with the rotational speed decreasing, however. Only when the electrically conductive area of the second path makes contact with the second additional contact element, may the motor be finally braked.

These contact elements may be contact springs. In this manner, a reliable contact between the contact disk and the contact elements may be established.

The present invention may build on a conventional method in that a contact-disk system according to the present invention may be used to control a windshield-wiper motor. In this manner, a contact-disk system according to the present invention may be implemented by a control method.

In an exemplary method according to the present invention it may be desirable if a switch connected to the contact-disk system is operated and if a rotation of the contact disk is maintained until the second additional contact element is connected to the electrically conductive area of the second path. Thus, the control method may allow the windshield wipers to be guided from one operating position to a park position in a reliable manner.

In this context, prior to connecting the second additional contact element to the electrically conductive area of the second path, the connection of the first additional contact element to the electrically conductive area of the first path may be interrupted. Although the electrical connection of the motor and the battery may already be interrupted during this created intermediate state, rotation may still occur nevertheless, due to the inertia of the involved components, although the rotational speed of the motor may decrease. Only when the second additional contact element contacts the electrically conductive area of the second path may an active braking of the motor occur.

The present invention may build on a conventional windshield-wiper motor in that it may have a contact disk according to the present invention. As a result, the windshield-wiper motor may implement desired features of a contact disk according to the present invention and an exemplary method according to the present invention. A windshield-wiper motor may be manufactured that has a reduced size.

The present invention may be based on a recognition that, by an appropriate arrangement of contact elements and a suitable geometric design of a contact disk, the functions of a three-path contact disk may be realized, as it may be used in conventional windshield-wiper motors, or by two-path contact disks. Therefore, windshield-wiper motors according to the present invention may also be produced in smaller sizes. The manufacturing process, in particular, may be simplified since a rotation of the motor on the workpiece-carrier of the assembly line may no longer be required.

DETAILED DESCRIPTION

In the following description of the drawings, identical elements have been provided with the same reference numerals.

Figure 2:
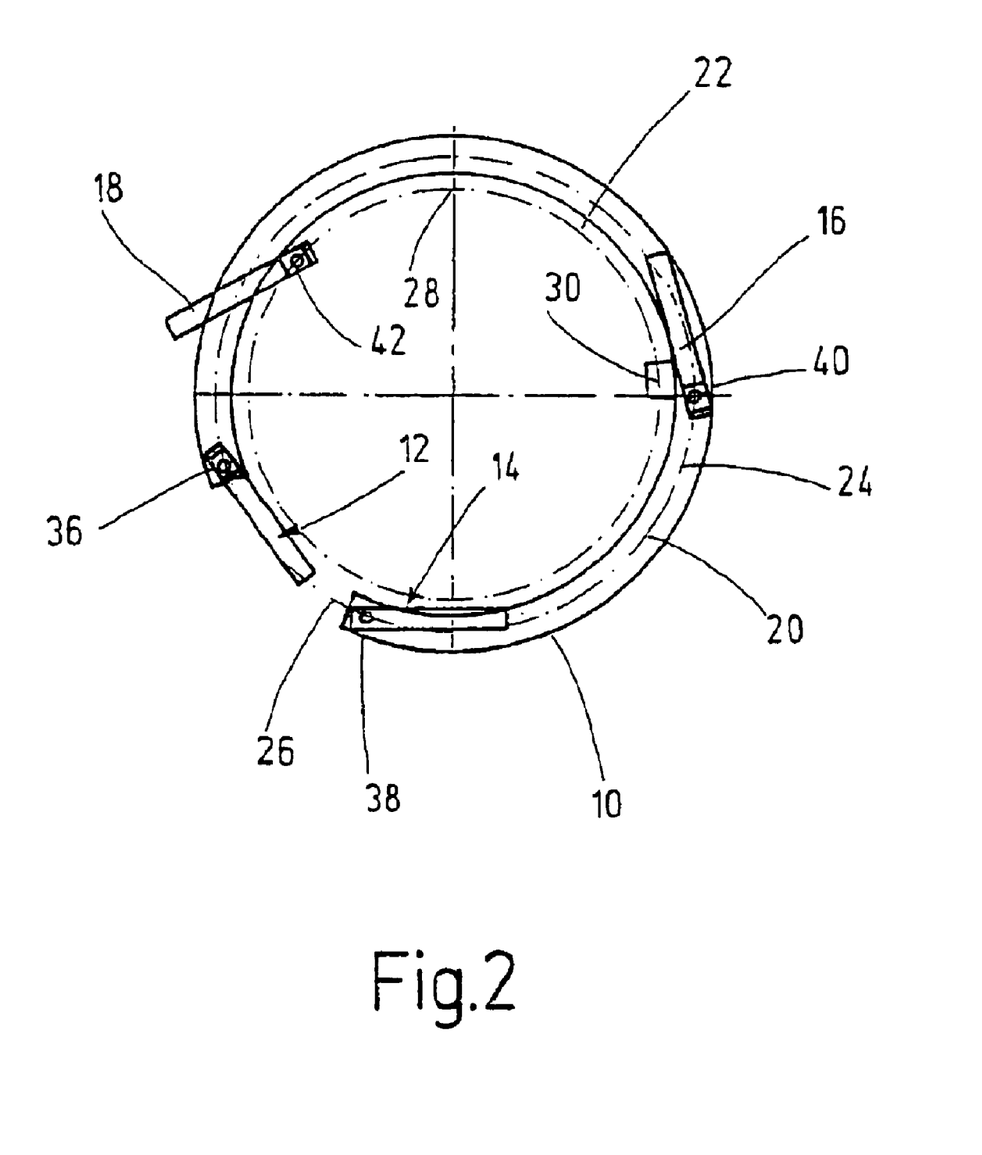
FIG. 2 shows a contact-disk system according to an exemplary embodiment of the present invention.

FIG. 2 shows a contact-disk system according to an exemplary embodiment of the present invention in a top view. The contact-disk system includes a contact disk 10 and a plurality of contact elements 12, 14, 16, 18. Contact elements 12, 14, 16, 18 are in the form of contact springs. Contact disk 10 has two paths 20, 22. First path 20 has a relatively long electrically conductive area 24 and a comparatively short electrically insulating area 26, which is realized by a gap in path 20. First path 20 is located in the radial direction outside of second path 22. This second path 22 has a relatively long electrically insulating area 28 and a comparatively short electrically conductive area 30. The electrically conductive area 30 is implemented as a short connecting piece to the electrically conductive area 24 of first path 20. Two contact elements 12, 14 of the plurality of contact elements 12, 14, 16, 18, which are referred to as selected contact elements 12, 14, have a clearance angle with respect to their contact areas 36, 38 that is greater than gap 26 in first path 20. In this manner, at least one of contact elements 12, 14 is always in contact with the electrically conductive area 24 of first path 20. First additional contact element 16 slides on first path 20. Second additional contact element 18 slides on second path 22. The angular range, which is covered by gap 26 in first path 20, is larger than the angular range that is covered by electrically conductive area 30 of the second path. Contact point 40 of first additional contact element 16 and contact point 42 of second additional contact element 18 as well as gap 26 in first path 20 and electrically conductive area 30 of second path 22 are arranged in such a manner with respect to each other that there exists a state in which neither first additional contact element 16 nor second additional contact element 18 is in contact by their respective paths. Also, the arrangement of first additional contact element 16 and second additional contact element 18 is and gap 26 in first path 20 and of electrically conductive area 30 of second path 22 are selected such that a state exists in which second additional contact element 18 is in contact with electrically conductive area 30 of second path 22, while first additional contact element 16 is located in electrically insulating area 26 of first path 20 and thus does not have any electrical contact to contact disk 10.

Figure 3:
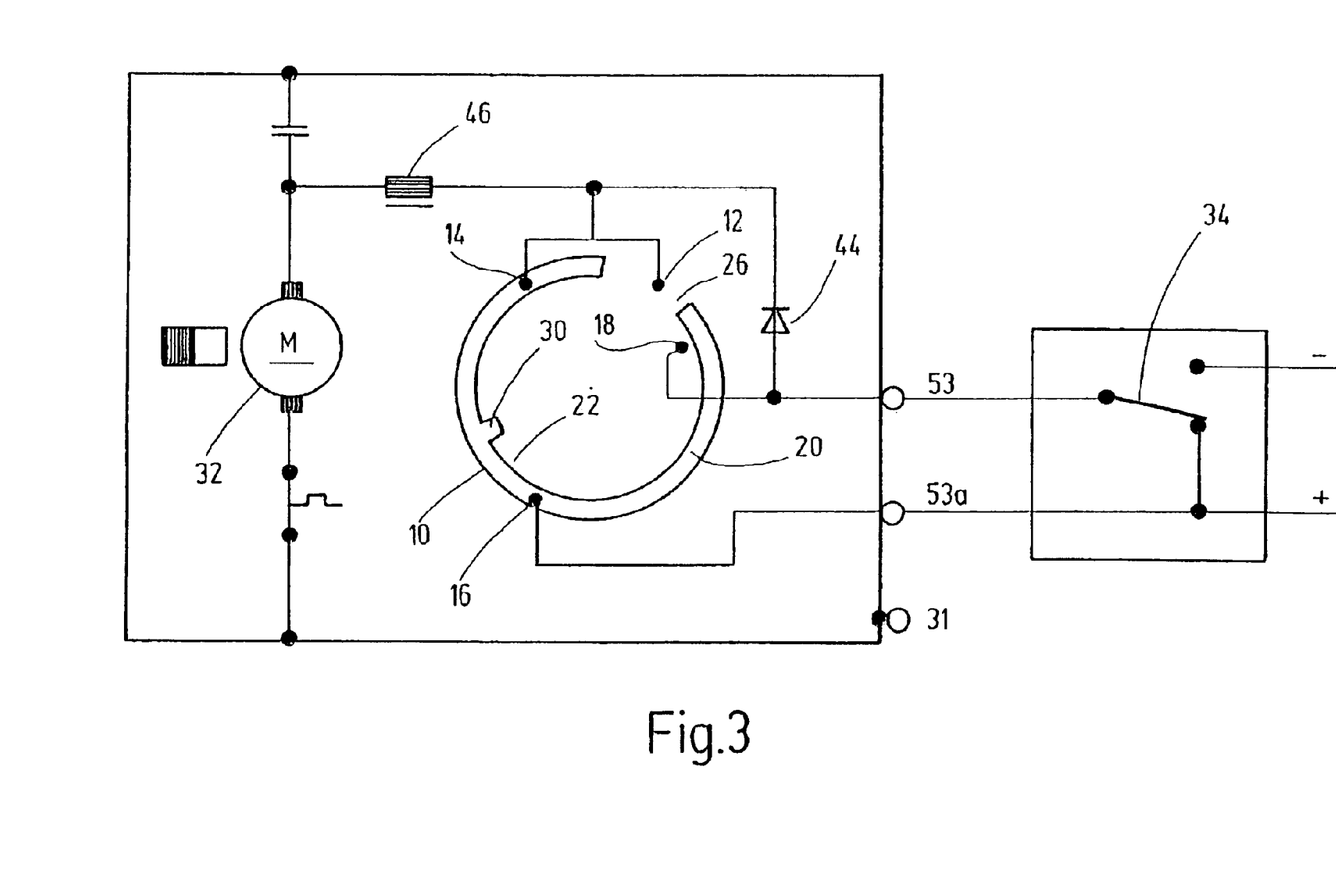
FIG. 3 shows an electrical circuit including a contact-disk system according to an exemplary embodiment of the present invention in switched-on state.

FIG. 3 shows an electrical circuit including a contact-disk system according to an exemplary embodiment of the present invention in a switched-on state. A switch 34, which may be in the form of a steering-column switch, establishes a connection between terminal 53 and the positive pole of the vehicle battery. In this manner, the positive potential is applied to motor 32 via terminal 53, a polarity-reversal damping diode 44 and a coil 46. This is independent of the position of contact disk 10 with regard to contact elements 12, 14, 16, 18, an arbitrary instantaneous survey of contact disk 10 rotating synchronously with motor 32 being depicted in the present case.

Figure 4:
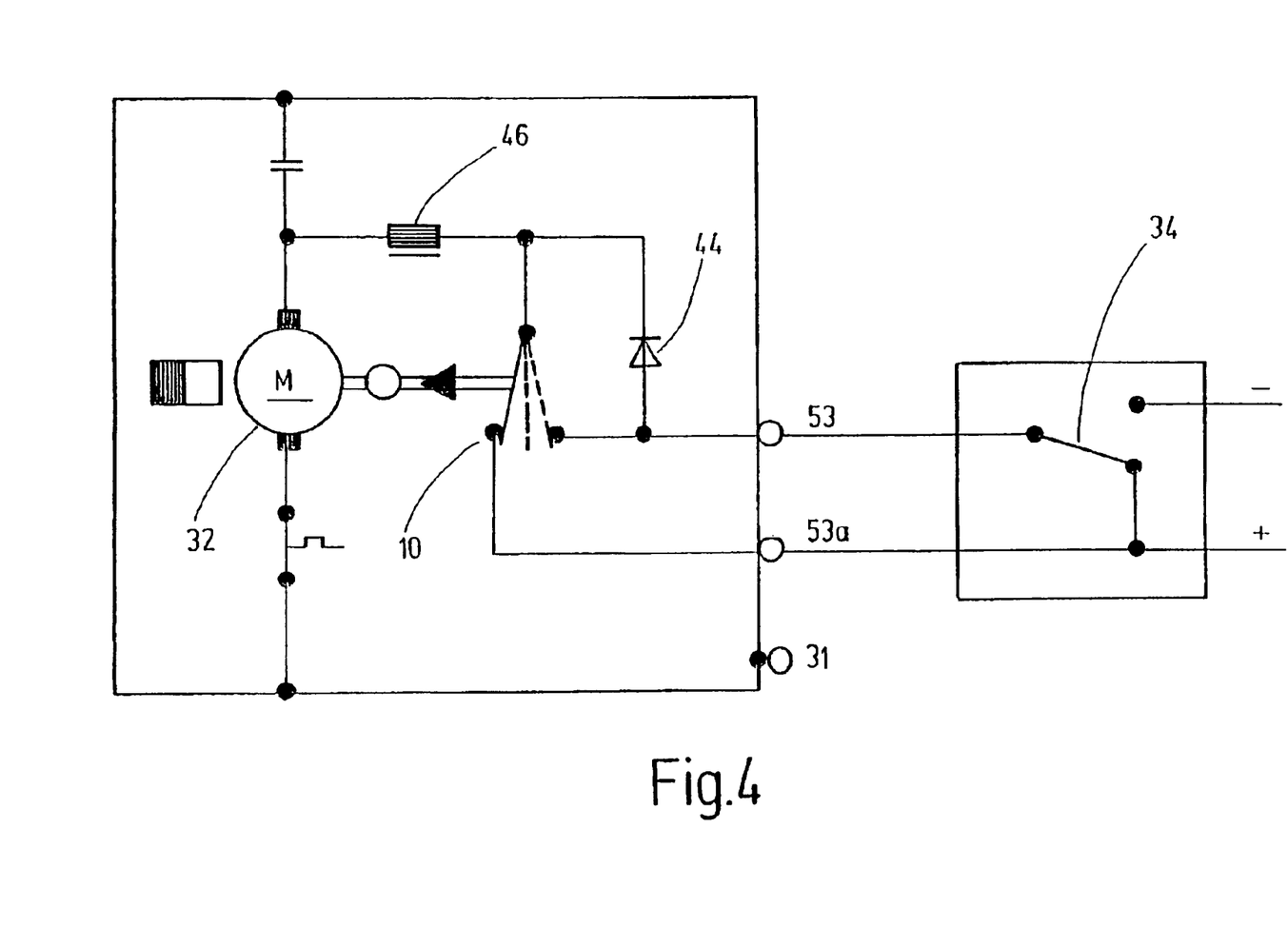
FIG. 4 shows a substitute circuit diagram of the circuit according to FIG. 3.

FIG. 4 shows a substitute circuit diagram according to FIG. 3. It is shown that terminal 53 may always be at a positive potential via switch 34. Contact disk 10, which is symbolized by a switch activated by motor 32, alternates between several switching states; at certain times an additional connection of motor 32 to the positive pole exists via terminal 53a. This is symbolized by the solid line in the symbolic depiction of contact disk 10. At other times, an additional connection of motor 32 to terminal 53 is provided. This is symbolized by the dashed line to the right of the symbolic depiction of contact disk 10. There is also a state in which contact disk does not establish any further connection of motor 32 to one of the terminals 53, 53a, which is represented by the center dashed line of the symbolically represented contact disk 10. Regardless of the switching states of disk 10, a positive potential may be given at motor 32 via coil 46 in switched-on state, i.e. the state in which switch 34 creates a connection to the positive pole.

Figure 5:
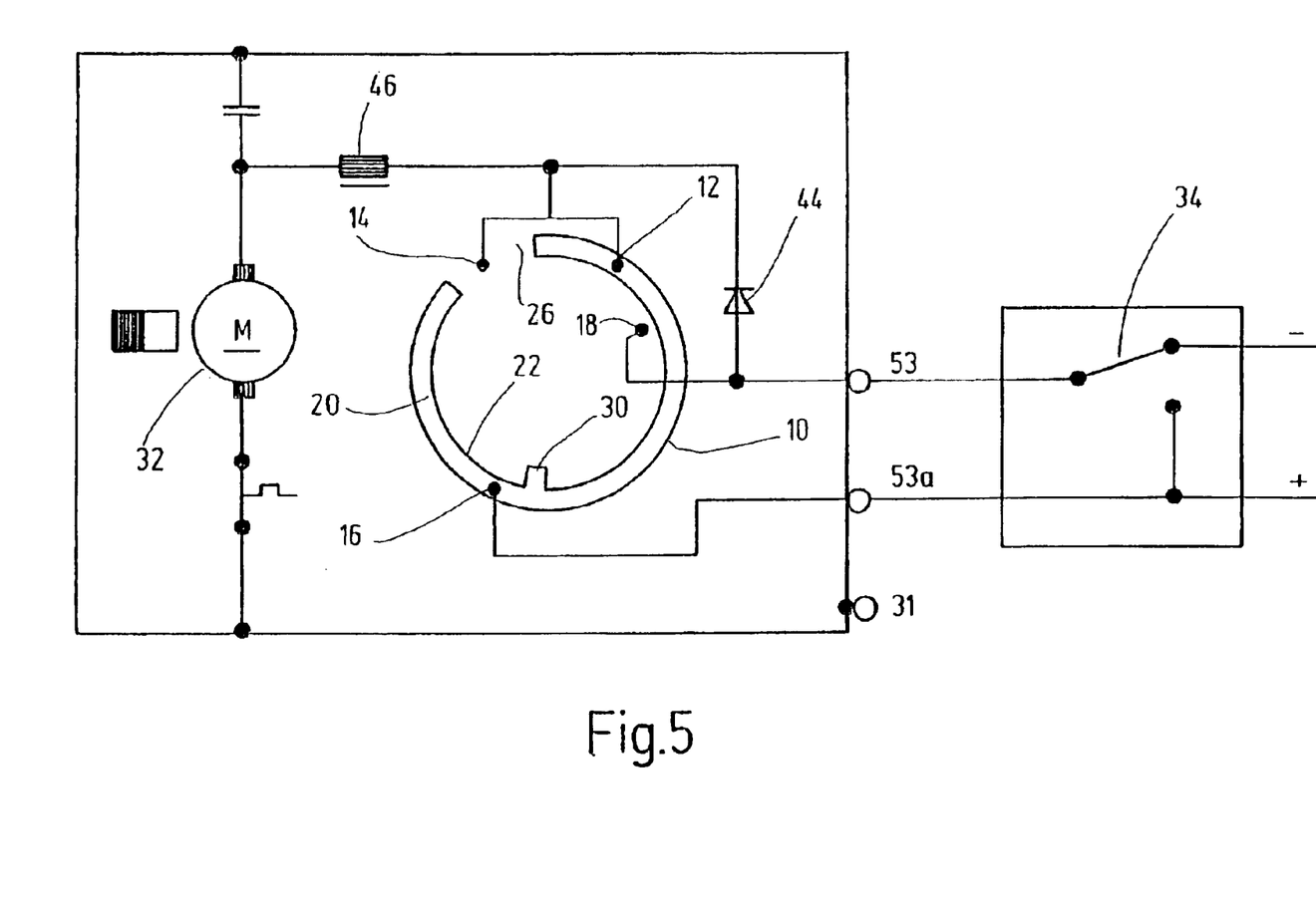
FIG. 5 shows an electrical circuit including a contact-disk system according to an exemplary embodiment of the present invention in a first intermediate state.

FIG. 5 shows an electrical circuit including a contact-disk system according to an exemplary embodiment of the present invention in a first intermediate state. Switch 34 has been switched to turn the window wiper off, so that a connection to the negative pole of the battery is now given by switch 34. However, motor 32 is still provided with the positive potential via terminal 53a, contact element 16, contact disk 10 and contact element 12. In the instantaneous survey represented in FIG. 5, contact element 14 is locate in the electrically insulating area of first path 20 of contact disk 10. Since the space between the selected contact elements 12, 14 is larger than gap 26 in first path 20 of contact element 10, contact disk 10 may always maintain a connection to motor 32. Second additional contact element 18, which is at a negative potential via terminal 53, is not in contact with the contact disk, since it is located in the electrically insulating area of second path 22.

Figure 6:
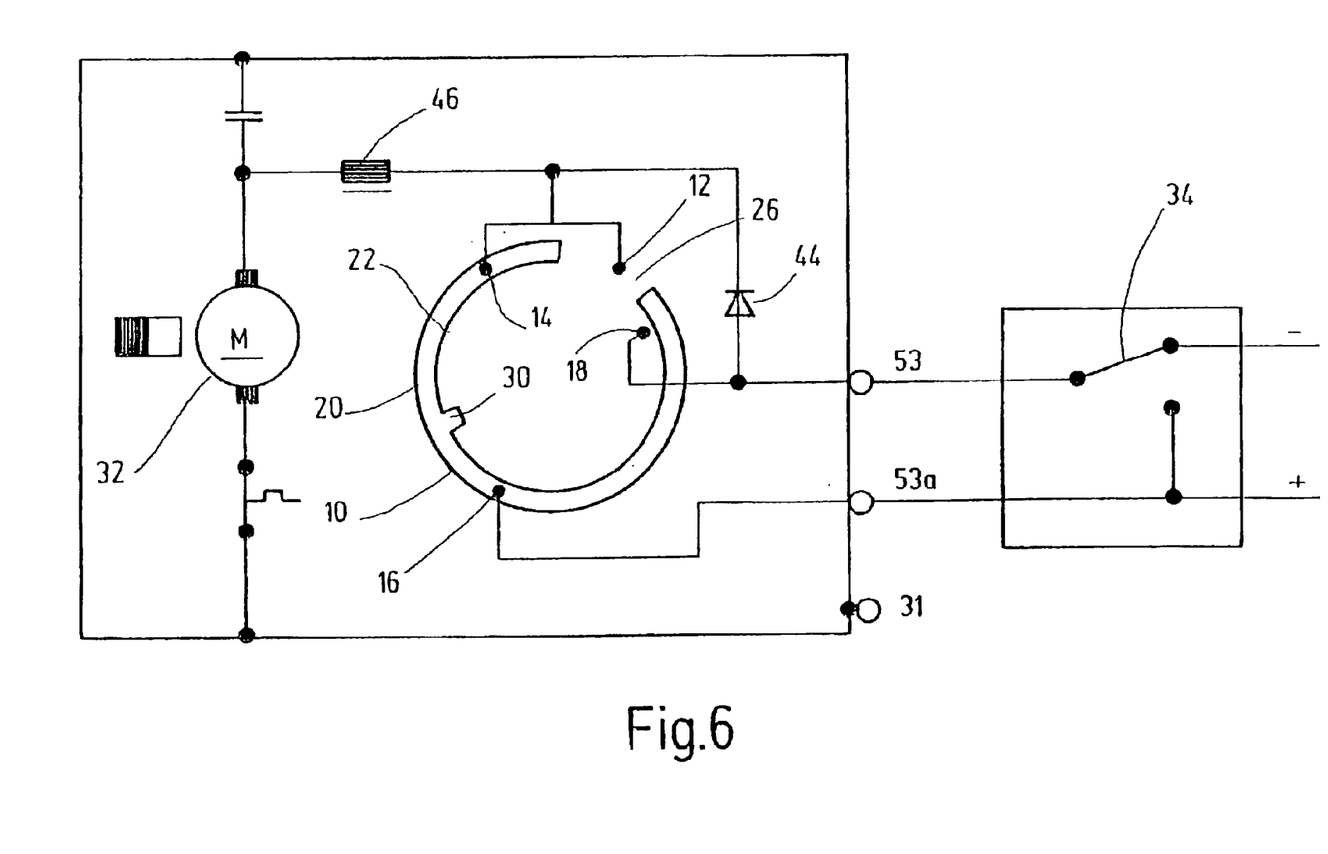
FIG. 6 shows an electrical circuit including a contact-disk system according to an exemplary embodiment of the present invention in a second intermediate state.

FIG. 6 shows an electrical circuit including a contact-disk system according to an exemplary embodiment of the present invention in a second intermediate state. This second intermediate state corresponds to the first intermediate state according to FIG. 5, with the exception that the contact of the positive pole is now provided via the other selected contact element 14.

Figure 7:
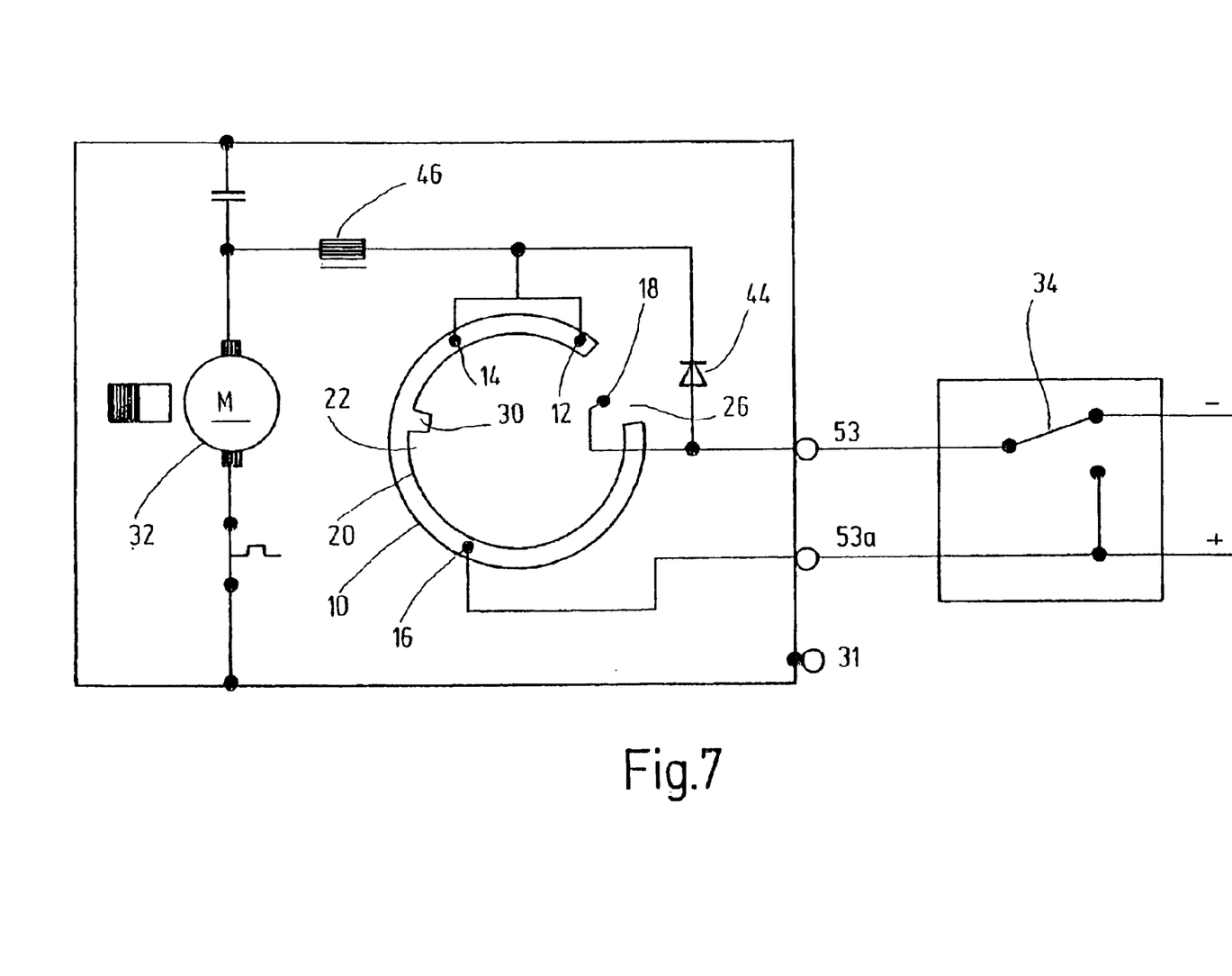
FIG. 7 shows an electrical circuit including a contact-disk system according to an exemplary embodiment of the present invention in a third intermediate state.

FIG. 7 shows an electrical circuit including a contact-disk system according to an exemplary embodiment of the present invention in a third intermediate state. This third intermediate state also corresponds to the first intermediate state according to FIG. 5 and the second intermediate state according to FIG. 6, with the exception that the connection between the positive pole and motor 32 is maintained by both selected contact elements 12, 14 in the instantaneous survey according to FIG. 7.

Figure 8:
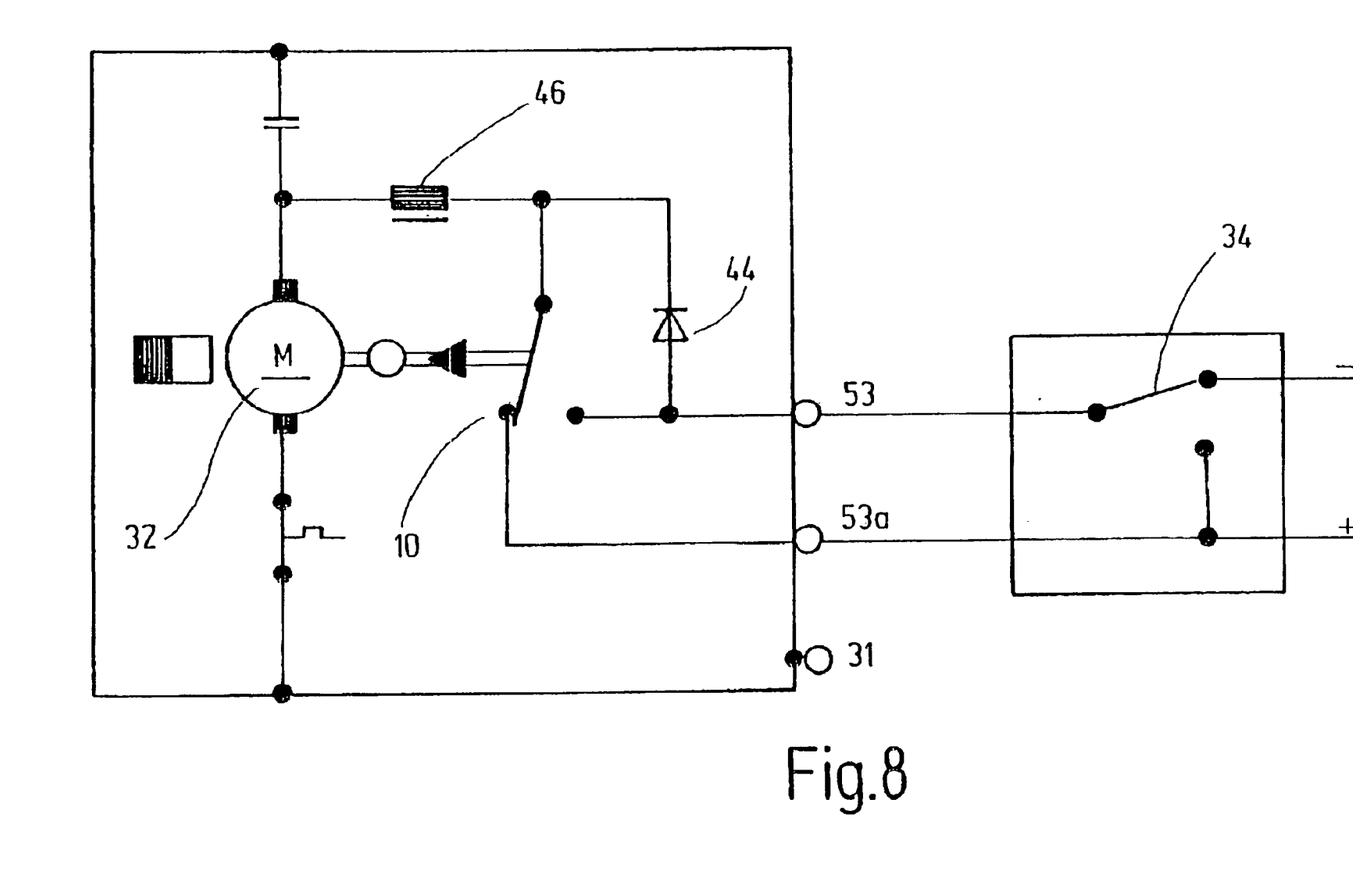
FIG. 8 shows a substitute circuit diagram of the circuits according to FIGS. 5 through 7.

FIG. 8 shows a substitute circuit diagram of the circuits according to FIGS. 5 through 7. In all states, the positive pole is connected to the motor via terminal 53a, so that its operation may be maintained.

Figure 9:
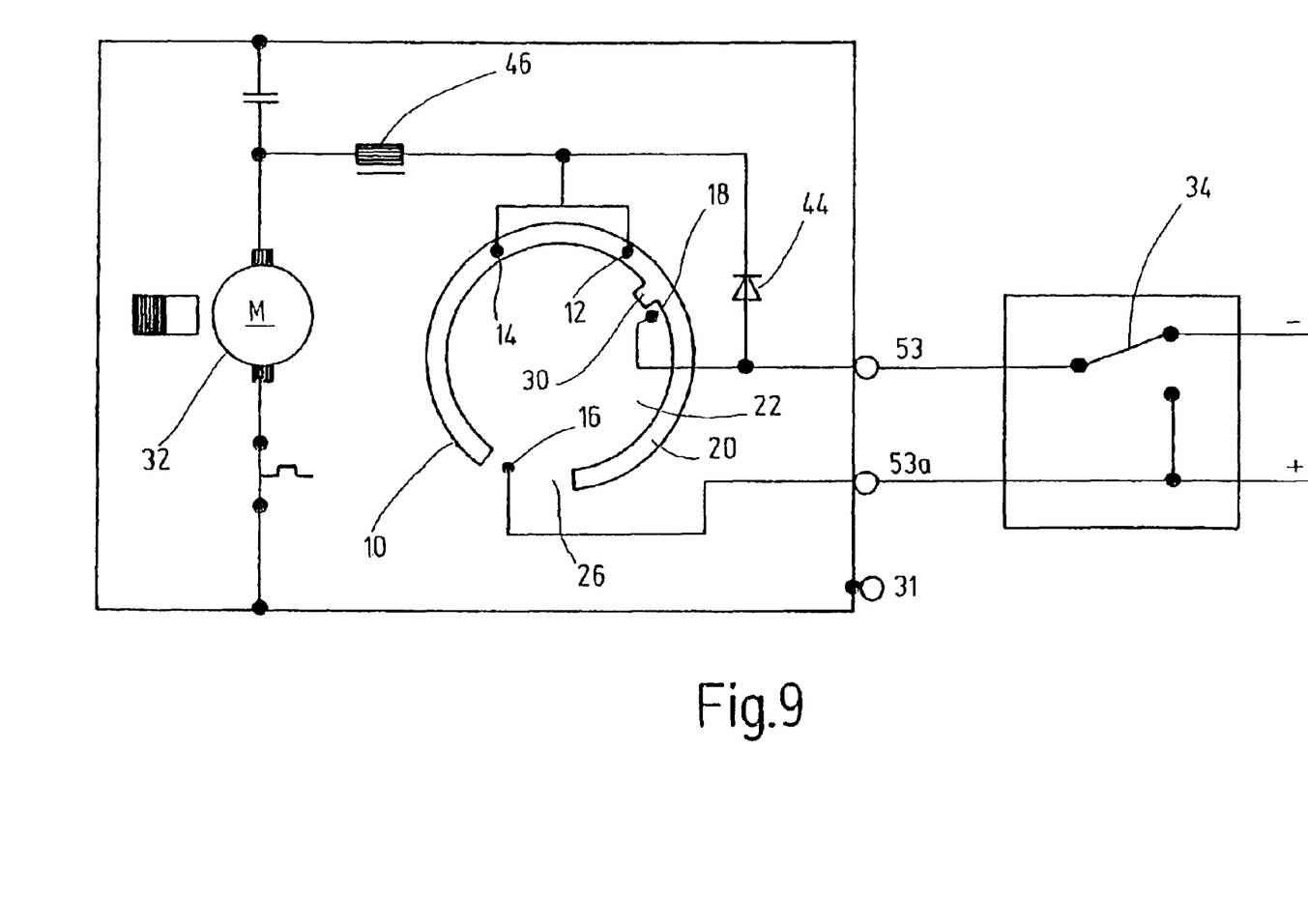
FIG. 9 shows an electrical circuit including a contact-disk system according to an exemplary embodiment of the present invention in a fourth intermediate state.

FIG. 9 shows an electrical circuit including a contact-disk system according to an exemplary embodiment of the present invention in a fourth intermediate state. This fourth intermediate state electrically differs from the first intermediate state, the second intermediate state and the third intermediate state. In the fourth intermediate state according to FIG. 9, the first additional contact element 16 is located in electrically insulating area 26 of first path 20. Therefore, the positive potential is no longer at the selected contacted elements 12, 14, so that there is also no longer any voltage at motor 32. Second additional contact element 18 is located in the electrically insulating area of second path 22, but just before contacting the electrically conductive area. Starting from the state according to FIG. 9, a further rotation of the contact disk may occur due to the inertia of the involved components.

Figure 10:
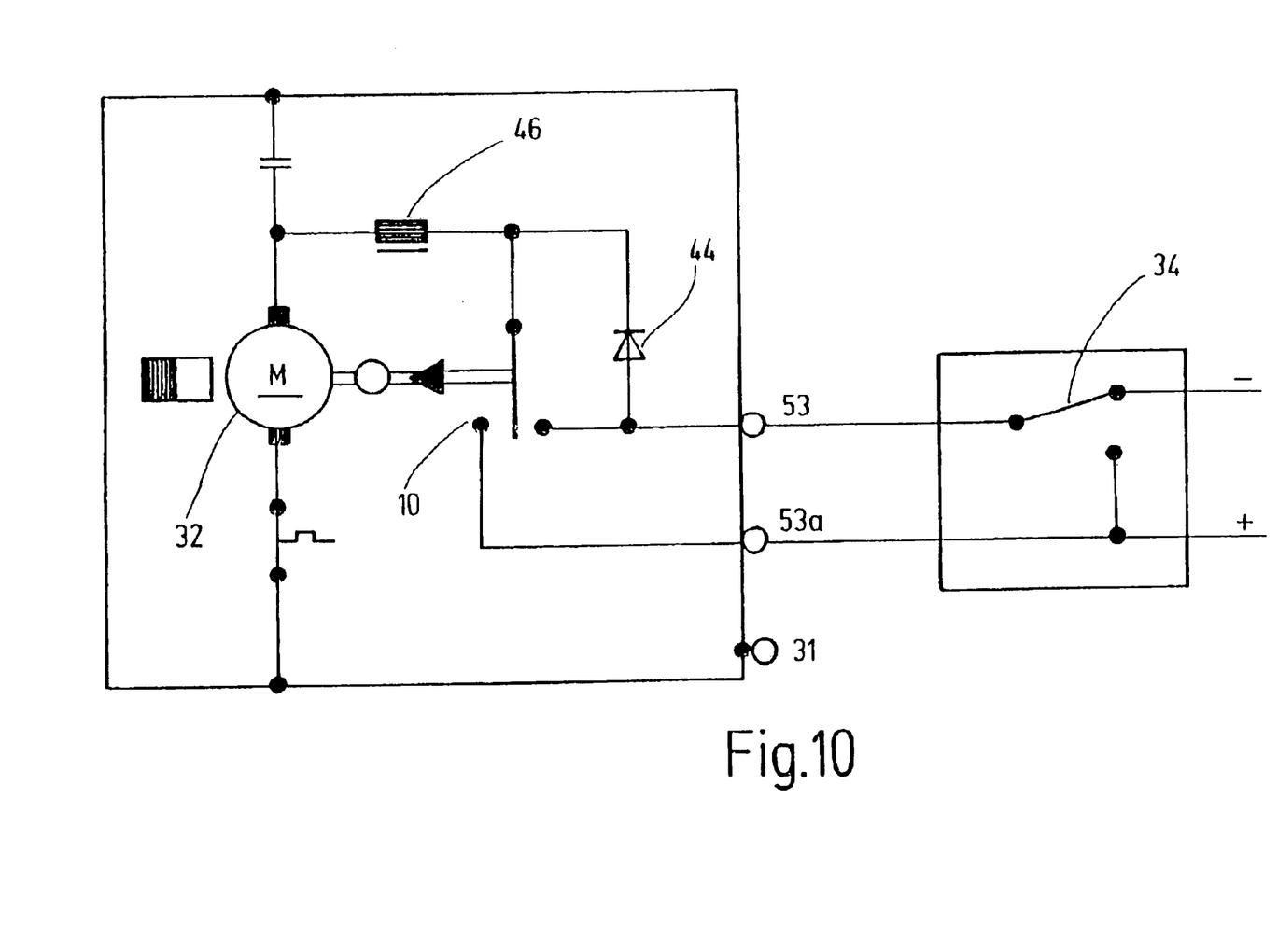
FIG. 10 shows a substitute circuit diagram of the circuit according to FIG. 9.

FIG. 10 shows a substitute circuit diagram of the circuit according to FIG. 9. It is shown that neither terminal 53a nor terminal 53 is connected to the motor. This indicates that there is neither a positive potential for the normal operation of motor 32, nor is there a negative potential at motor 32, which would short-circuit motor 32.

Figure 11:
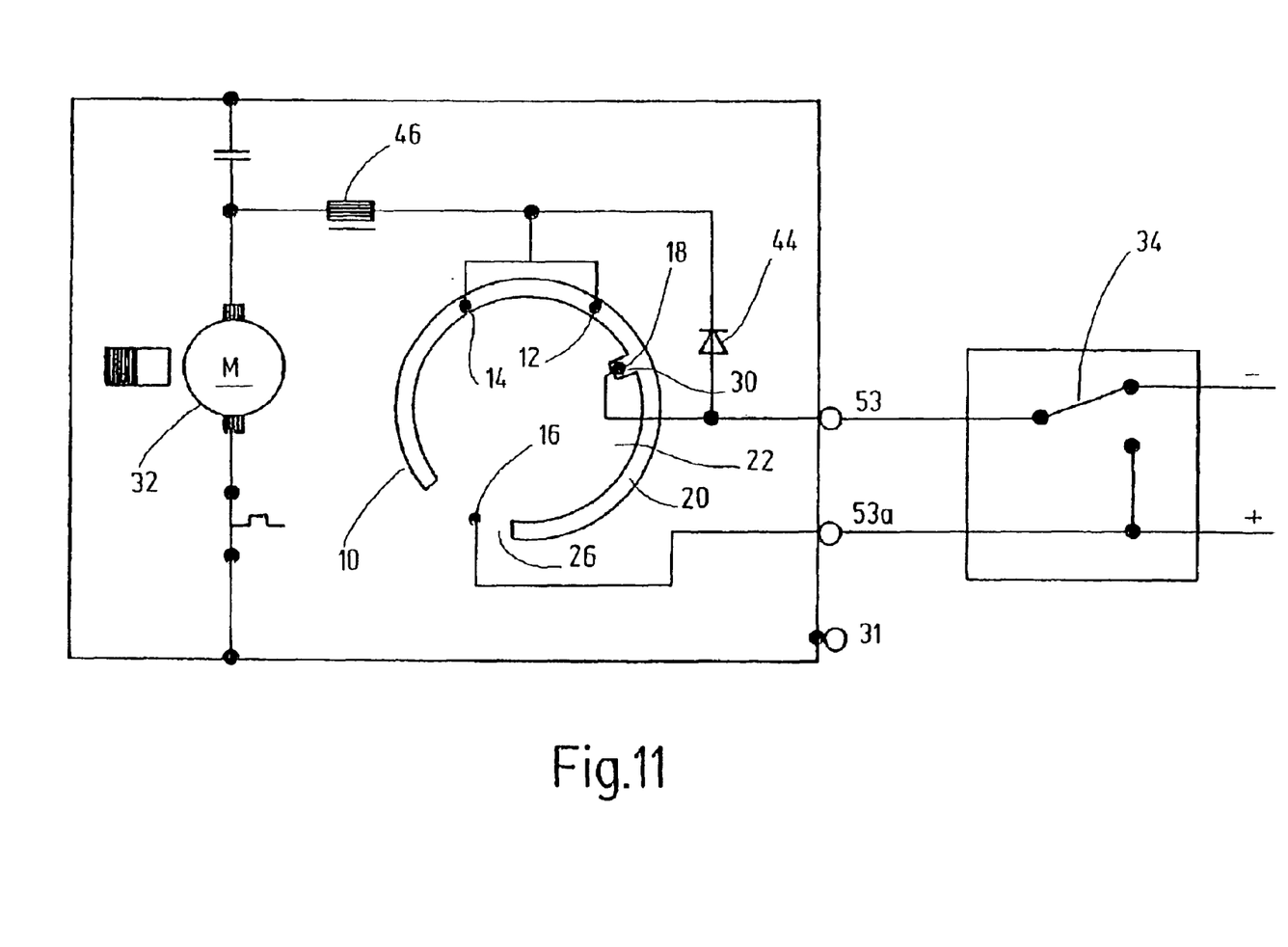
FIG. 11 shows an electrical circuit including a contact-disk system according to an exemplary embodiment of the present invention in a switched-off state.

FIG. 11 shows an electrical circuit including a contact-disk system according to an exemplary embodiment of the present invention in a switched-off state. In accordance to FIG. 9, here, too, contact element 16 is located in electrically insulating area 26 of path 20. In contrast to FIG. 9, however, in the instantaneous survey according to FIG. 11, contact element 18 is in electrically conductive area 30 of second path 22. Thus, a connection exists between the negative pole and the motor via terminal 53 and contact element 18. Motor 32 is short-circuited and thereby actively braked. The windshield-wiper is in park position.

Figure 12:
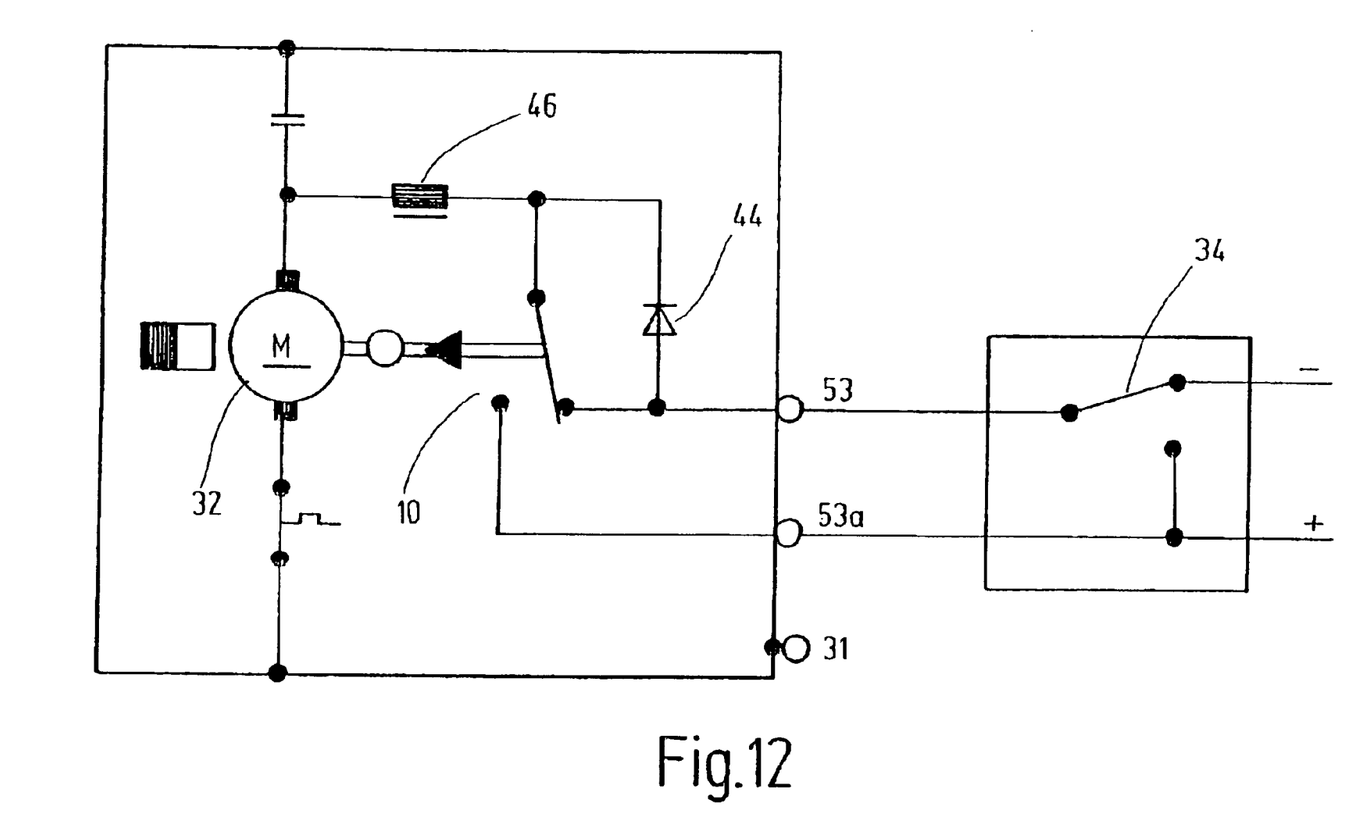
FIG. 12 shows a substitute circuit diagram of the circuit according to FIG. 11.

FIG. 12 shows a substitute circuit of diagram of the circuit according to FIG. 11. It may be seen that the switch, which symbolizes contact disk 10, connects motor 32 to the negative pole, so that it is short-circuited.

The preceding description of exemplary embodiments according to the present invention may be for illustrative

What is claimed is:

1. A contact-disk system comprising:

a rotatable contact disk having a plurality of paths; and a plurality of contact elements, each contact element being assigned to one of the plurality of paths, wherein:

two selected contact elements of the plurality of contact elements are always at a same electrical potential and glide on a same path;

the plurality of paths include a first path having an electrically conductive area and an electrically insulating area;

the two selected contact elements slide on the first path;

at least one contact element of the two selected contact elements is connected to the electrically conductive area of the first path; and the electrically insulating area is realized by a gap in the electrically conductive area; and a spacing between the two selected contact elements is larger than the gap in the electrically conductive area.

2. The contact-disk system according to claim 1, wherein the plurality of contact elements include a first additional contact element which glides on the first path.

3. The contact-disk system according to claim 2, wherein:

the plurality of paths include a second path having an electrically insulating area and an electrically conductive area; and the plurality of contact elements include a second additional contact element which glides on the second path.

4. The contact-disk system according to claim 3, wherein the gap in the electrically conductive area of the first path, the electrically conductive area of the second path, the first additional contact element, and the second additional contact element are arranged so that the first additional contact element is not connected to the electrically conductive area of the first path and the second additional contact element is not connected to the electrically conductive area of the second path.

5. The contact-disk system according to claim 3, wherein an angular range covered by the electrically conductive area of the second path is less than an angular range covered by the electrically insulating area of the first path.

6. The contact-disk system according to claim 1, wherein there are two paths.

7. The contact-disk system according to claim 1, wherein the plurality of contact elements include contact springs.

8. A method for controlling a windshield-wiper motor using a contact-disk system, comprising:

configuring a rotatable contact disk to have a plurality of paths including a first path having an electrically conductive area and an electrically insulating area and a second path having an electrically insulating area and an electrically conductive area;

configuring a plurality of contact elements;

assigning each contact element to one of the plurality of paths;

arranging two contact elements to be at a same electrical potential and to glide on a same path;

arranging the two selected contact elements to slide on the first path;

connecting at least one contact element of the two selected contact elements to the electrically conductive area of the first path;

configuring the electrically insulating area of the first path to be a gap in the electrically conductive area of the first path;

arranging a space between the two selected contact elements to be larger than the gap;

arranging a first additional contact element of the plurality of contact elements to glide on the first path;

arranging a second additional contact element to glide on the first path;

arranging the gap in the electrically conductive area of the first path, the electrically conductive area of the second path, the additional contact element, and the second additional contact element so that the first additional contact element is not connected the electrically conductive area of the first path and the second additional contact element is not connected to the electrically conductive area of the second path; and configuring an angular range covered by the electrically conductive area of the second path to be less than an angular range of the electrically insulating area of the first path.

9. The method according to claim 8, further comprising:

operating a switch connected to the contact-disk system; and maintaining a rotation of the contact disk until the second additional contact element is connected to the electrically conductive area of the second path.

10. The method as recited in claim 8, further comprising:

disconnecting the first additional contact element from the electrically conductive area of the first path prior to connecting the second additional contact element to the electrically conductive area of the second path.

11. A windshield-wiper motor, comprising:

a contact-disk system including a rotatable contact disk having a plurality of paths and a plurality of contact elements, each contact element being assigned to one of the plurality of paths, wherein:

two selected contact elements of the plurality of contact elements are always at a same electrical potential and glide on a same path;

the plurality of paths include a first path having an electrically conductive area and an electrically insulating area;

the two selected contact elements slide on the first path;

at least one contact element of the two selected contact elements is connected to the electrically conductive area of the first path; and the electrically insulating area is realized by a gap in the electrically conductive area; and a spacing between the two selected contact elements is larger than the gap in the electrically conductive area.

* * * * *